United States Patent
Leijon et al.

[11] Patent Number: 6,002,084
[45] Date of Patent: Dec. 14, 1999

[54] LINE SECTION OF A GAS-INSULATED LINE

[75] Inventors: Mats Leijon; Li Ming; Liu Rongsheng, all of Västeras; Dan Windmar, Vittinge; Bertil Moritz, Västeras, all of Sweden

[73] Assignee: Asea Brown Boveri AG, Baden, Switzerland

[21] Appl. No.: 08/785,545

[22] Filed: Jan. 21, 1997

[30] Foreign Application Priority Data

Feb. 8, 1996 [DE] Germany .......................... 196 04 481

[51] Int. Cl.[6] .................................................. H02G 15/24
[52] U.S. Cl. .................. 174/21 R; 174/25 G; 285/288.1
[58] Field of Search .................... 174/28, 89, 91, 174/102 SC, 21 R, 21 JS, 25 G, 21 C; 285/288.1, 334.5

[56] References Cited

U.S. PATENT DOCUMENTS

| | | | |
|---|---|---|---|
| 1,881,160 | 10/1932 | Armacost | 285/288.1 |
| 3,671,663 | 6/1972 | Seifert et al. | 174/102 SC X |
| 3,792,191 | 2/1974 | Perry et al. | 174/84 R |
| 3,814,830 | 6/1974 | Cronin et al. | |
| 4,164,243 | 8/1979 | Cookson et al. | 138/162 |
| 4,415,763 | 11/1983 | Cookson | 174/28 |
| 4,621,169 | 11/1986 | Petinelli et al. | 174/102 SC X |
| 5,439,713 | 8/1995 | Yamaoka et al. | 427/433 |

FOREIGN PATENT DOCUMENTS

| | | |
|---|---|---|
| 647782 | 7/1937 | Germany . |
| 1540096 | 12/1969 | Germany . |
| 4009101A1 | 12/1969 | Germany . |
| 2021066 | 3/1971 | Germany . |
| 3204887A1 | 12/1982 | Germany . |
| 3722480A1 | 1/1989 | Germany . |

OTHER PUBLICATIONS

"Entwicklungsmoglichkeiten russgefullter Compounds noch nicht ausgeschopft", Wessling, B., Kunststoffe 79 (1989), pp. 1009–1011.

"Kunststoff–Formmassen mit elektrischer Leitfahigkeit", H.J. Mair, Kunststoffe 73 (1983), pp. 516–519.

*Primary Examiner*—Kristine Kincaid
*Assistant Examiner*—William H. Mayo, III
*Attorney, Agent, or Firm*—Burns, Doane, Swecker & Mathis, L.L.P.

[57] ABSTRACT

The line section of a gas-insulated line contains a high-voltage electric conductor and a pressure pipe which is made from a thermoplastic material and filled with insulating gas. The pressure pipe holds the electric conductor on insulated supports. The pressure pipe has two pipes which are welded to one another on the end faces thereof, the end section being respectively widened to flare outwardly in the radial direction with the welding of the two pipes.

14 Claims, 1 Drawing Sheet

LINE SECTION OF A GAS-INSULATED LINE

BACKGROUND OF THE INVENTION

1. Field of the Invention

The invention proceeds from a line section of a gas-insulated line having at least one high-voltage electric conductor and a pressure pipe which is made from a thermoplastic material, is filled with insulating gas and holds the at least one electric conductor on insulated supports. Gas-insulated lines are used with advantage to transmit energy in conurbations, since they can be laid underground and can be set up or extended without being substantially impaired by the infrastructure determined by the traffic, the supply of water and gas and the disposal of sewage.

2. Discussion of Background

A line section of the type mentioned at the beginning is disclosed, for example, in U.S. Pat. No. 4,415,763. In this patent application, a gas-insulated line is described in which a high-voltage electric conductor is arranged in a pipe which is filled with compressed $SF_6$ and is made from an insulating material such as polyethylene, in a typical case. Provided on the lateral surface of the insulating pipe is a layer which is made from conductive or semiconducting material, acts in a field-controlling fashion and conducts any return current which may occur.

SUMMARY OF THE INVENTION

Accordingly, one object of this invention as specified in the patent claims is to provide a novel line section of the type mentioned at the beginning which can be produced and maintained in a particularly simple and cost-effective way, and which at the same time is distinguished by good dielectric properties.

The line section as claimed in the invention can be produced cost-effectively and quickly without cost-intensive flanged connections by sequentially welding pipe sections made from thermoplastic material to one another in sections. It is also possible at the same time to combine with the welding of two sequential pipe sections a trumpet-like widening of the mutually facing ends of the two pipe sections in the radial direction. This widening effectively shields the edges present at the weld of the two pipe sections, and so the dielectric behavior of the gas-insulated line is improved without additional measures. The widening can be carried out in a simple way by a conically shaped tool which, as the mutually facing ends of the pipe sections to be welded are heated is pushed into the pipe ends with a low feeding force, forming the two widened parts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
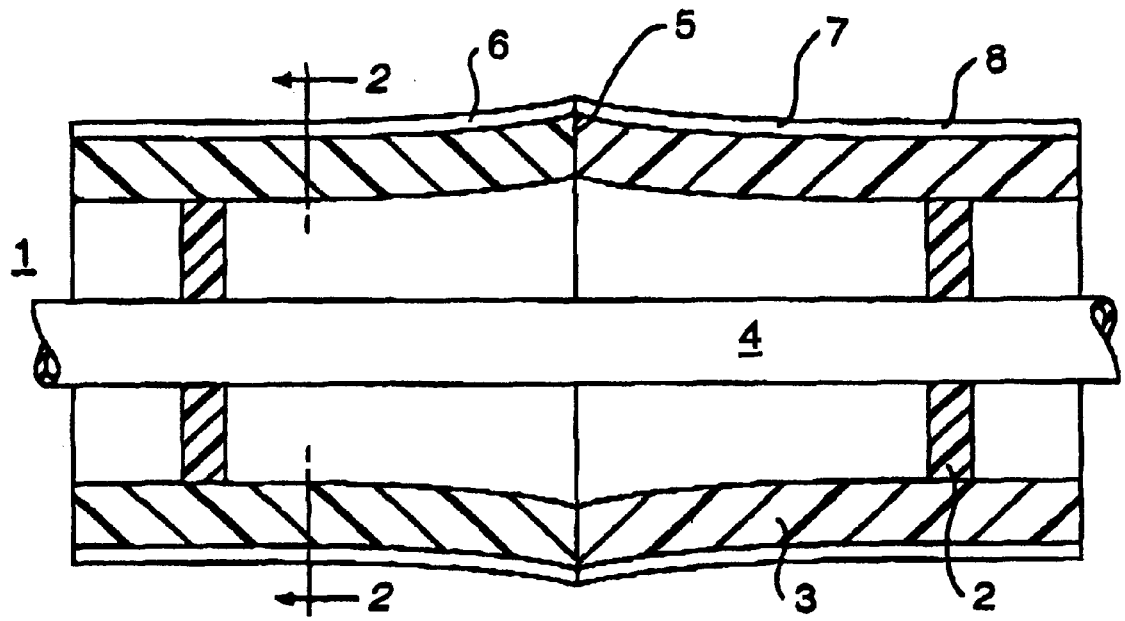
FIG. 1 shows a plan view of a radially guided section through an embodiment of a line section of a gas-insulated line according to the invention.
Figure 2:
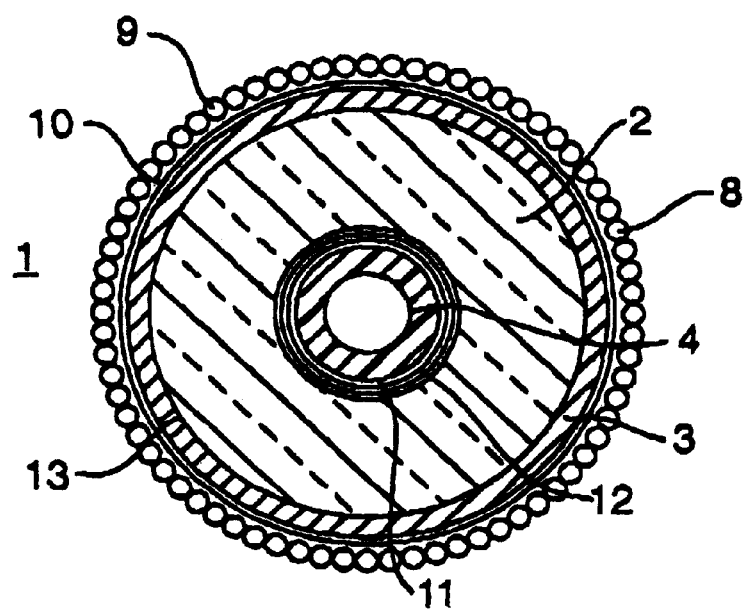
FIG. 2 shows a plan view in the direction of the arrow onto a section guided along II—II through the line section according to FIG. 1.

Referring now to the drawings, wherein like reference numerals designate identical or corresponding parts throughout the several views, the line section, represented in FIGS. 1 and 2, of a gas-insulated line 1 has an electric conductor 4 which is mounted centrally on pin-type insulators 2 in a pressure pipe 3, is constructed to be axially symmetric and hollow and is at a high-voltage potential of, for example, 220 kV. The pressure pipe 3 is filled with an insulating gas, such as $SF_6$, at a pressure of up to a few bar, and consists of an insulating material, a thermoplastic polymer being used as material for the insulating material. For the purposes of shielding the line section electrostatically, the thermoplastic can be filled with an electrically conductive material, for example with carbon black. It is important above all that the thermoplastic consists of non-crosslinked material and can be effectively shaped and effectively welded at increased temperatures. A suitable thermoplastic material is, for example, a high-density polyethylene.

The pressure pipe 3 is constructed from pipe sections approximately 4–12 m long which are welded to one another at the end faces. At the weld 5 of two successive pipe sections 6, 7, the ends, welded to one another, of the two pipe sections are widened like a trumpet i.e., flared radially outwardly. A conical widened part with a diameter at the weld 5 which is larger than the unchanged part of the pipe section 6, 7 by very little, by about 2 to 4%, is already sufficient to achieve effective dielectric shielding of edges and material inhomogeneities present at the weld.

It is expedient to fill the thermoplastic material of the pressure pipe 3 with electrically conductive material such as, for example, carbon black, since, on the one hand, in this way the gas-insulated line 1 is effectively shielded electrostatically from the outside, and since, on the other hand, the pressure pipe is assigned a defined potential and a particularly effective shielding of the weld 5 provided in the region of the widened ends of the pipe sections 6, 7 is achieved.

In the case of the polyphase system in which each phase is arranged in a separate pressure pipe, it is generally sufficient when a return conductor which serves to absorb a compensating current is arranged parallel to the pressure pipes. Such a return conductor can, however, advantageously also be located on the lateral surface of the pressure pipe or in the pressure pipe. A return conductor 8 which serves to absorb encapsulation currents or earth currents is to be seen arranged on the lateral surface of the pressure pipe 3 in FIGS. 1 and 2. This return conductor is advantageously formed by a fabric 9, surrounding the pressure pipe like a hose, made from electrically conductive material, for example a metal wire fabric based on copper of aluminum or a copper or aluminum alloy.

A layer 10 of electrically semiconducting material and surrounding the metal wire fabric 9 is applied to the lateral surface of the pressure pipe 3. This semiconducting layer shields the gas-insulated line 1 electrostatically from outside. This shielding effect is achieved without the metal wire fabric 9. If the metal wire fabric 9—as described—is provided, the layer 10 simultaneously homogenizes the electrostatic field of the gas-insulated line 1, which is, as the case may be, substantially distorted by the individual wires of the metal wire fabric 9. A creepage-current-inhibiting layer 13 is provided on the inner surface, facing the electric conductor 4, of the pipe sections 6, 7. This layer contains a material which emits water at high temperatures, the material being, for example, in the form of hydrargillite, crystalline aluminum hydroxide ($Al(OH)_3$). If a metallic particle having sharp edges is deposited during operation of the gas-insulated line 1 on the layer 13, these edges are strongly heated upon the occurrence of partial electric discharges. $Al(OH)_3$ present in the region of the edges is heated locally to over 100° C. and in the process emits small quantities of water which react with the metallic material of the edges and oxidize this material away to form a dielectrically harmless particle without edges. Creepage currents and traces caused by these creepage currents are avoided in this way on the inner surface of the pressure pipe.

It is also possible instead of Al(OH)$_3$ to use a different material, which, upon being heated, emits a gaseous or vaporous substance which reacts with the heated edges of the metallic particle.

It is particularly advantageous in each case to produce the layers 10 and 13, which are present as the case may be, from a polymer into which the semiconducting material or the material emitting gas or vapor is embedded as filler. If use is made as polymer of a polymer which forms the thermoplastic material of the pressure pipe 3, the coated pressure pipe can be produced in a particularly cost-saving way by, for example, coextrusion of the polymer forming the pressure pipe, the polymer filled with semiconducting material and/or the polymer filled with material which emits gas or vapor. A pipe produced in such a way has a single polymer matrix having surface layers which act differently. Because of this construction, pores are avoided to the greatest possible extent in the support surfaces of the two layers 10, 13, and consequently the risk of the occurrence of undesired partial discharges in the material of the coated pressure pipe is also very substantially reduced.

An improvement in the dielectric strength of the conductor section of a gas-insulated line can further be achieved additionally by providing the electric conductor 4 held in the pressure pipe 3 with a sheath 11 made from insulating material. In order to avoid undesired dielectric loads between the electric conductor 4 and the insulating material 11, the electric conductor bears on its lateral surface a layer 12 made from an electrically semiconducting material on which the insulating sheet 11 is applied.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A line section of a gas-insulated line having at least one high-voltage electric conductor, said line section comprising:
    a pressure pipe arrangement which is made from a thermoplastic polymer, which is filled with insulating gas and holds the at least one electric conductor on insulated supports,
    wherein the thermoplastic polymer consists of a non-crosslinked material;
    wherein the pressure pipe arrangement includes at least two pipes which are welded to one another on mutually facing ends, and
    wherein end sections of the at least two pipes include a means for increasing a dielectric behavior of the line section, said means comprising the mutually facing ends of the at least two pipes being respectively widened to flare outwardly in a radial direction, in which widening of the end sections is combined with welding of the at least two pipes.

2. The line section as claimed in claim 1, wherein the thermoplastic polymer is filled with electrically conductive material.

3. The line section as claimed in claim 1, wherein a potential-control layer is provided on a lateral surface of the at least two pipes.

4. The line section as claimed in claim 3, wherein the potential-control layer contains an electrically semiconducting material.

5. The line section as claimed in claim 3, wherein a creepage-current-inhibiting layer is provided on an inner surface of the at least two pipes, facing the at least one electric conductor.

6. The line section as claimed in claim 5, wherein the creepage-current-inhibiting layer contains a material which emits gas or vapor at high temperatures.

7. The line section as claimed in claim 6, wherein the gas or vapor emitting material is Al(OH)$_3$.

8. The line section as claimed in claim 5, wherein at least one of the potential-control layer or the creepage-current-inhibiting layer contains a thermoplastic polymer which is filled with a material including at least one of the properties of semiconducting and emitting gas or vapor at high temperatures.

9. The line section as claimed in claim 8, wherein the at least two pipes and at least one of the potential-control layer or the creepage-current-inhibiting layer include an identical thermoplastic polymer.

10. The line section as claimed in claim 1, further comprising an encapsulation conductor for conducting encapsulation current which is provided on a lateral surface of the each of said two pipes and made from electrically conductive material, wherein the encapsulation conductor contains a metal wire fabric circumferentially surrounding the pressure pipe.

11. The line section as claimed in claim 1, wherein the at least one electric conductor held in the pressure pipe arrangement is surrounded by a sheath made from insulating material.

12. The line section as claimed in claim 11, wherein a layer made from electrically semiconducting material is arranged between the at least one electric conductor and the insulating sheath.

13. The line section as claimed in claim 2, wherein the electrically conductive material is carbon black.

14. The line section as claimed in claim 1, wherein a creepage-current-inhibiting layer is provided on an inner surface of the at least two pipes, facing the at least one electric conductor.

* * * * *